United States Patent [19]

Schust et al.

[11] Patent Number: 5,435,133
[45] Date of Patent: Jul. 25, 1995

[54] HYDRODYNAMIC CLUTCH

[75] Inventors: Bernhard Schust, KreBberg; Hermann Schwarz, Frankenhardt, both of Germany

[73] Assignee: Voith Turbo GmbH & Co. KG, Crailsheim, Germany

[21] Appl. No.: 97,670

[22] Filed: Jul. 27, 1993

[30] Foreign Application Priority Data

Jul. 27, 1992 [DE] Germany ............... 42 24 728.4

[51] Int. Cl.6 ............................................. F16D 33/14
[52] U.S. Cl. ............................................. 60/351; 60/357
[58] Field of Search ........................... 60/351, 357, 358

[56] References Cited

U.S. PATENT DOCUMENTS

| | | | |
|---|---|---|---|
| 1,975,505 | 10/1934 | Fottinger | 60/357 |
| 3,237,408 | 3/1966 | Bunnelle et al. | 60/358 |
| 4,023,362 | 5/1977 | Rogner et al. | 60/351 |
| 4,350,011 | 9/1982 | Rogner et al. | 60/358 |

Primary Examiner—F. Daniel Lopez
Attorney, Agent, or Firm—Baker & Daniels

[57] ABSTRACT

A hydrodynamic clutch with a generally horizontal axis, specifically for underground operation. The clutch includes a primary wheel, a secondary wheel, a housing which comprises two essentially axially perpendicular end walls as well as a peripheral wall which is essentially concentric to the axis of the clutch, a scooping bowl fastened to the primary wheel, forming a scooping space and revolving jointly with the primary wheel (rotor), outlet bores discharging from the working space into the scooping space, and a scooping pipe dipping into the scooping space. At least one antechamber has an inlet port for receiving leakage water entrained and thrown off by the outside surface of the rotor. A line is used for transfer of operating fluid from the antechamber to the scooping space.

4 Claims, 2 Drawing Sheets

HYDRODYNAMIC CLUTCH

BACKGROUND OF THE INVENTION

The invention concerns a hydrodynamic clutch. The hydrodynamic clutch is of the type having an essentially horizontal axis, specifically for underground operation. A primary wheel is seated on a drive shaft, and a secondary wheel is seated on an output shaft. A housing comprises two essentially axially perpendicular end walls and, relative to the clutch axis, an essentially concentric peripheral wall. A scoop bowl is fastened to the primary wheel, forming a scooping space, and revolving jointly with the primary wheel. Outlet bores discharge from the working space into the scooping space, and a scooping pipe dips into the scooping space.

Such a clutch is known from the German utility patent 7,913,100. On this clutch, the housing comprises in its lower part a collection container for an operating fluid sump, additionally an upright container into which fluid from the sump is pumped, and lastly a splash disk which dips into the sump and lifts the fluid to the level of the collection container.

Clutches of this type may be either regulated or unregulated. Presently, they predominantly concern applications in underground operations. Here, the clutch is generally operated with water representing the operating fluid, frequently pit water.

Outlet bores are provided on the inside and outside diameters of the working circuit, so as to constantly release from the working space a certain amount of the operating fluid, i.e., of the water, and to circulate it for cooling purposes. These outlet orifices empty into a concomitantly rotating scooping space, or discharge into the clutch housing. The scooping space, i.e., the space between primary wheel and scooping bowl, is emptied by a scooping pipe, which then feeds the discharged operating fluid into a return system.

However, the operating fluid does not only accumulate in the scooping space. A sump is formed also outside the scooping bowl, between the outer peripheral surface of the scooping bowl and the inside surface of the peripheral wall of the housing where leakage fluid accumulates. Removal of this leakage fluid is critical for the following reasons: in view of the space constrictions underground, it is naturally desired to keep the outer dimensions of the clutch housing as small as possible. Therefore, also the gap space between the outside surface of the scooping bowl and the inner peripheral surface of the housing is small. Thus, there is no room for the arrangement of pumps or pump type units. Nonetheless, removal of the leakage fluid must be ensured, since during operation—due to rotor leakage or overflow—operating fluid constantly flows into the housing.

The problem underlying the invention is to so design a clutch such that the leakage fluid between scooping bowl and housing will be removed reliably, with little construction expense, and without appreciable energy losses.

SUMMARY OF THE INVENTION

This problem is solved by the features of the present invention.

A hydrodynamic clutch with a generally horizontal axis is provided.. The hydrodynamic clutch includes a primary wheel seated on a drive shaft, a secondary wheel seated on an output shaft, and a housing. The housing comprises two essentially axially perpendicular end walls, and relative to the clutch axis, an essentially concentric peripheral wall. A scoop bowl is fastened to the primary wheel, forming a scooping space, and revolving jointly with the primary wheel. The hydrodynamic clutch further includes outlet bores discharging from the working space into the scooping space, a scooping pipe dipping into the scooping space, at least one antechamber with an inlet port for receiving leakage water entrained and thrown off by the outside surface of the primary wheel, and a line for transfer of operating fluid from the antechamber into the scooping space.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
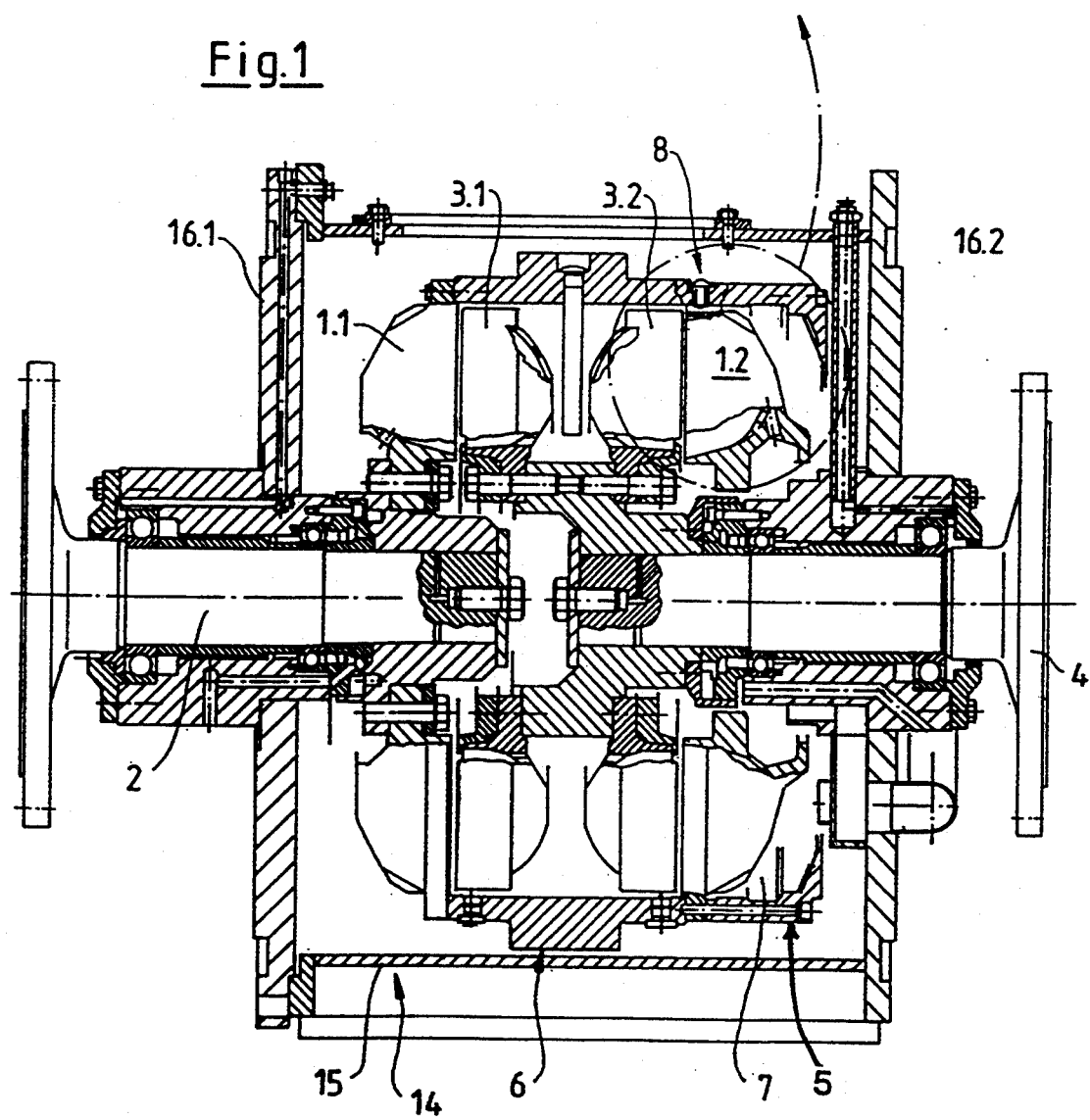
FIG. 1 shows the clutch in axial section.

The clutch is fashioned as a double clutch, but may be fashioned also with a single circuit. Here, it features two toroidal working spaces, each formed by a primary wheel (pump wheel) and a secondary wheel (turbine wheel). The two primary wheels 1.1 and 1.2 are driven by a drive shaft 2. The two secondary wheels 3.1 and 3.2, are nonrotationally secured to an output shaft 4. The two primary wheels 1.1 and 1.2 are nonrotationally connected to one another by a cylinder section 5, which extends beyond the working space illustrated in FIG. 1, right. This cylinder section features an enlargement which acts as a splash disk 6 and, in relation to the two working spaces, extends symmetrically in axial direction. Moreover, in FIG. 1, the cylinder section 5 is extended beyond the working space shown at right, so that it forms a scooping space 7. Thus, the scooping space 7 revolves with the cylinder section 5.

Also provided are quantity-regulable bores, or dosing valves 8, as shown in the section of FIG. 1. By way of this dosing valve 8, operating fluid proceeds into the scooping space. Also provided is a scooping pipe 9. The entire operating fluid is fed via this scooping pipe to a collection container, for instance an upright container, or directly into a drain line, or proceeds in direct circulation via a cooling unit back into the working circuit.

According to the invention, antechambers 10.1 and 10.2 are provided. These feature each an inlet port 11.1, 11.2 and are equipped with a stripping edge 12.1, 12.2. The two stripping edges are of such design and arrangement that the leakage fluid entrained by the splash disk 6 will on its upward path be stripped and passed into the appropriate antechamber. Due to the dual arrangement of the two antechambers 10.1, 10.2 and the illustrated design and arrangement of the stripping edges, operation in both directions of rotation is possible. Leakage fluid is stripped off the splash disk 6 at any rate.

Lines 13.1 and 13.2 are shown, connecting the appropriate antechamber with the scooping space 7.

Figure 2:
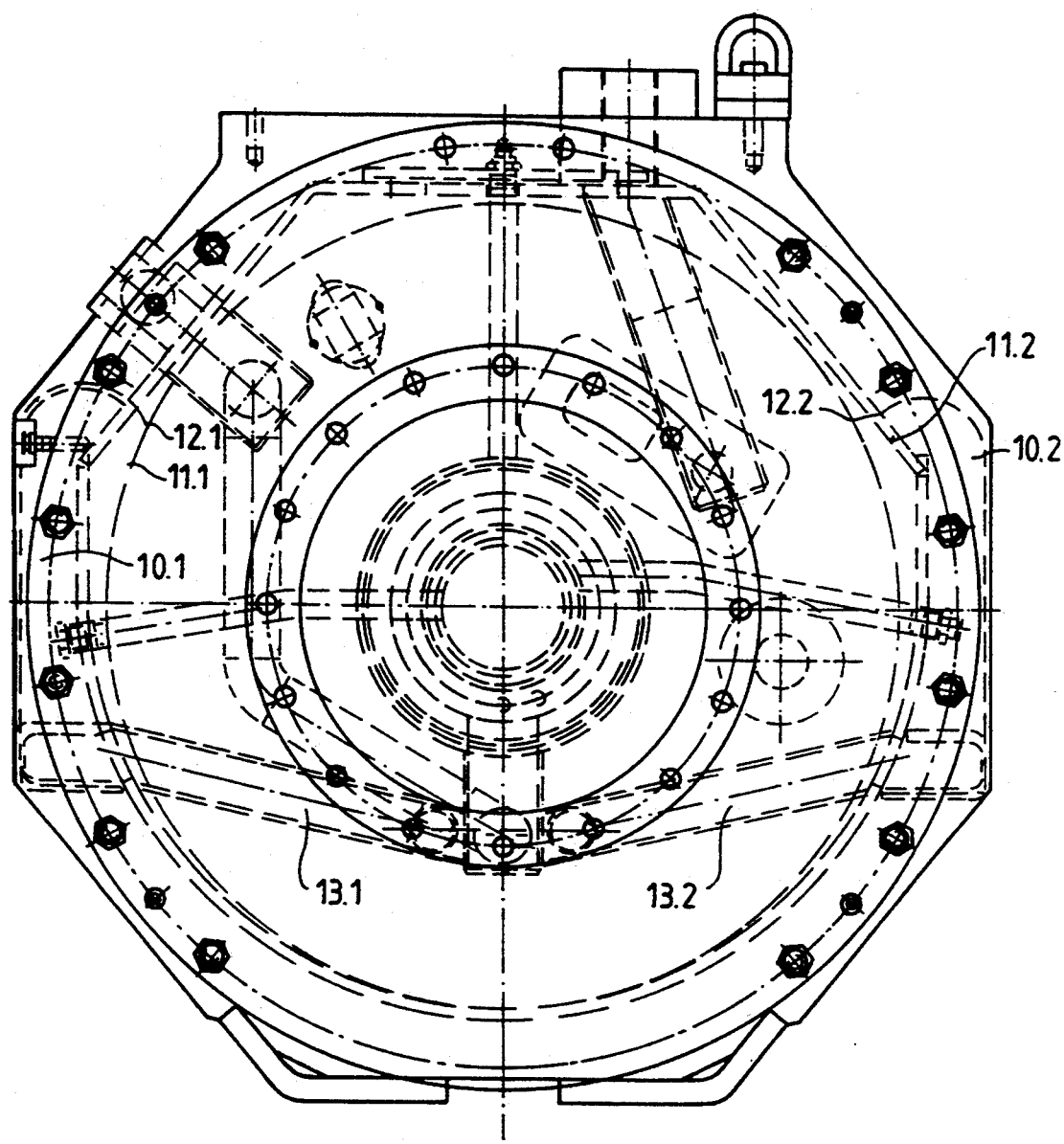
FIG. 2 shows the clutch in plan view in axial direction.

The clutch features a housing 14. Housing 14, relative to the clutch axis, comprises an essentially concentric peripheral wall 15 as well as two essentially disk-shaped end walls 16.1 and 16.2. In the embodiment shown, the two antechambers 10.1 and 10.2 are formed utilizing the peripheral wall 15 of the housing 14. It is understood that in this respect there are also other options available. As shown in FIG. 2, the antechambers are suitably situated at the level of the axial center plane and extend peripherally a certain distance beyond this center plane.

It may be suitable to fashion the peripheral wall 15 of the housing in such a way that the gap between the inner shell surface of the peripheral wall 15 and the outer shell surface of the splash disk 6 increases continuously up to the inlet port 11.1, or 11.2.

The arrangement of the clutch is such that its axis extends horizontally, but the clutch may also be used at an inclined to vertical orientation.

According to the invention, operating fluid collecting in the housing due to leakage, or via discharge orifices, or at clutch shutoff, is at start-up fed into the antechambers by means of splash disk 6. Concurrent losses due to acceleration and disk friction are minimal.

The operating fluid then flows, unpressurized, from the antechambers into the concomitantly revolving scooping space 7.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydrodynamic clutch having a generally horizontal axis and an axial center plane, said hydrodynamic clutch comprising:
    a primary wheel seated on a drive shaft, said primary wheel having an outside surface;
    a secondary wheel seated on an output shaft;
    a housing comprising two generally axially perpendicular end walls and, relative to the clutch axis, a generally concentric peripheral wall;
    a scoop bowl fastened to the primary wheel, forming a scooping space, and revolving jointly with the primary wheel;
    outlet bores discharging from a working space into the scooping space;
    a scooping pipe dipping into the scooping space;
    at least one antechamber with an inlet port for receiving operating fluid entrained and thrown off by the outside surface of the primary wheel, said antechamber being situated at the level Of said axial center plane and extending in peripheral direction beyond said center plane; and
    a line for transfer of operating fluid from the antechamber into the scooping space, wherein fluid in said antechamber and said line for transfer is substantially nonpressurized.

2. A clutch according to claim 1, wherein the inlet port of the antechamber includes a stripping edge for stripping operating fluid off the outside surface of the primary wheel.

3. A clutch according to claim 1, in which there are two antechambers provided, each antechamber having an inlet port, wherein each inlet port is arranged such that operation in both directions of rotation may be effected.

4. A clutch according to claim 1, wherein said scooping pipe is stationary.

* * * * *